United States Patent [19] [11] 4,354,779
Vaughan [45] Oct. 19, 1982

[54] DRILLING TOOLS
[75] Inventor: Christopher A. Vaughan, Morden, England
[73] Assignee: Kango Electric Hammers Limited, London, England
[21] Appl. No.: 158,384
[22] Filed: Jun. 11, 1980
[30] Foreign Application Priority Data
  Jun. 19, 1979 [GB] United Kingdom ............... 7921313
[51] Int. Cl.³ ...................... B23B 49/00; B23B 45/14
[52] U.S. Cl. ................................ 408/241 S; 173/21; 408/14; 408/113; 408/202
[58] Field of Search .............. 408/14, 113, 114, 202, 408/241 S; 145/129; 33/185 R; 173/21, 46; 279/28, 29; 403/107

[56] References Cited
U.S. PATENT DOCUMENTS

| 1,679,168 | 7/1928 | O'Brien | 403/107 X |
| 2,216,872 | 10/1940 | Baxendale | 279/28 |
| 3,633,682 | 1/1972 | Moores, Jr. | 33/185 R X |
| 4,113,404 | 9/1978 | Lippacher et al. | 408/241 S |

Primary Examiner—Z. R. Bilinsky
Attorney, Agent, or Firm—Wenderoth, Lind & Ponack

[57] ABSTRACT

A depth stop for a drilling tool comprises a rod 12 mounted on the tool body for sliding movement in directions parallel to the drilling movement, and a locking lever 15 pivotally mounted about a pivot boss 16 which projects at a substantially right angle to but is offset from the rod. The rod, extends through an aperture in the upper part 18 of the lever which aperture provides a radical clearance for the rod, and a spring 19 biases the lever so as to bring a peripheral edge or opposite peripheral edges of an aperture through the lever into frictional engagement with the rod and the biasing direction is the same as the direction in which the rod tends to move when it comes into abutment with a workpiece. The rod can be released by manually swivelling the lever against the spring force. The rod 12 may have a knurled surface 14 so as to provide substantially a mechanical lock with the co-operating peripheral edge of the lever aperture.

12 Claims, 8 Drawing Figures

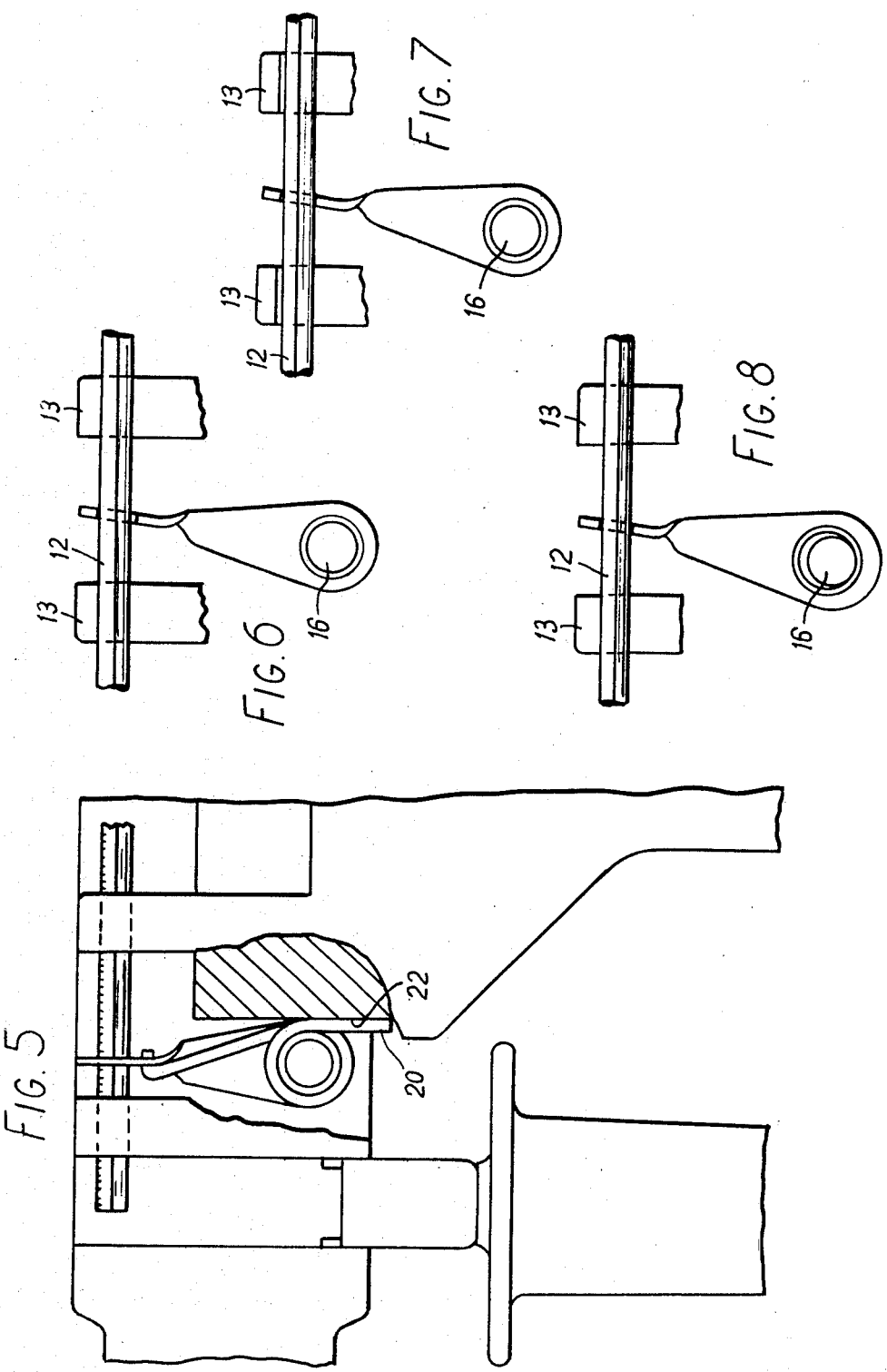

DRILLING TOOLS

BACKGROUND AND SUMMARY OF THE INVENTION

This invention relates to drilling tools and is more particularly concerned with the provision of depth stop devices in such tools.

According to the invention there is provided a drilling tool having a depth stop device comprising a depth stop rod mounted on the body of the tool for guided sliding movement along the longitudinal axis thereof in directions parallel to the direction of drilling movement, and a lever mounted on the body of the tool for pivotal movement about an axis extending normally with respect to the longitudinal direction of the rod but offset to one side of the rod, said lever being resiliently biased into a rotational position about said axis on which position a detent edge of the lever engages the rod and movement of the rod relative to the body of the tool resulting from abutment of the rod with a workpiece operates in a sense to rotate the lever in the same direction as the biasing force thereon and to urge the detent edge into tighter engagement with the rod, and said lever being movable against the biasing force of the spring to disengage the detent edge from the rod.

While the frictional grip of the detent edge on the rod is adequate for very light tools, the surface of the rod engaged by the detent edge is preferably knurled to provide substantially a mechanical lock between the two components.

In preferred arrangements according to the invention, said detent edge engages the surface of the rod remote from said axis. In one preferred construction the rod extends through an aperture in the lever, part of the edge of the lever bounding the aperture constituting said detent edge.

In some circumstances according to the invention, the lever provides a second detent edge for engaging the opposite side of the rod from that engaged by the first detent, and means is provided for permitting limited relative movement of the lever and the rod in a direction generally lengthwise of the lever.

BRIEF DESCRIPTION OF THE DRAWINGS

One embodiment of the invention will now be described by way of example with reference to the accompanying drawings in which:

FIGS. 3 and 4 are views along the section line A—A of FIG. 2 showing the depth stop device in its locked and unlocked conditions respectively, FIG. 5 is a fragmentary view on the line B—B of FIG. 4, FIG. 6 is a diagrammatic side view of the lever and rod of the arrangement of FIG. 1, and FIGS. 7 and 8 are diagrammatic side views respectively showing two further embodiments of the invention.

DETAILED DESCRIPTION OF THE PRESENT INVENTION

Figure 1:
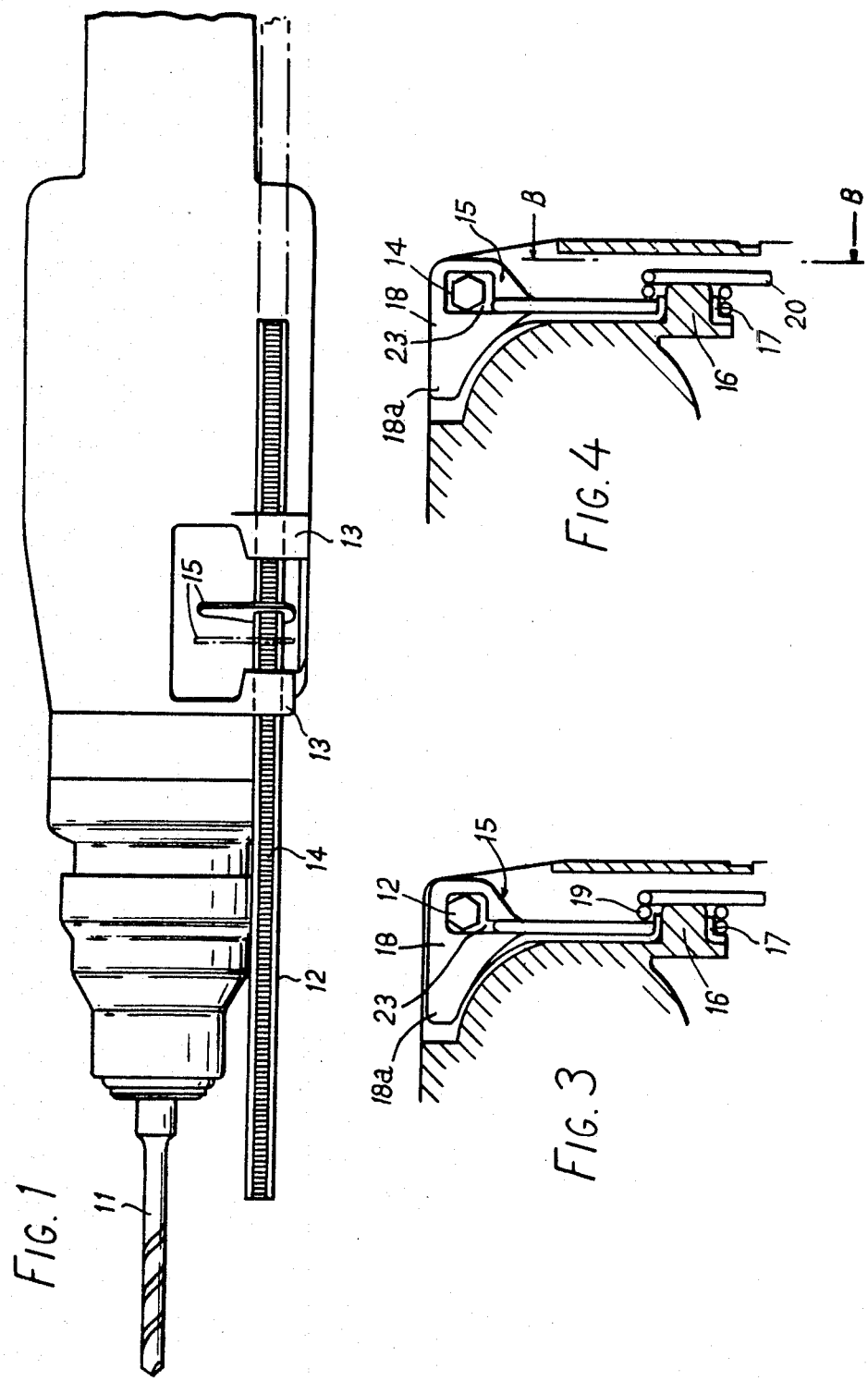
FIG. 1 is a diagrammatic plan view of a tool according to the invention.
Figure 2:
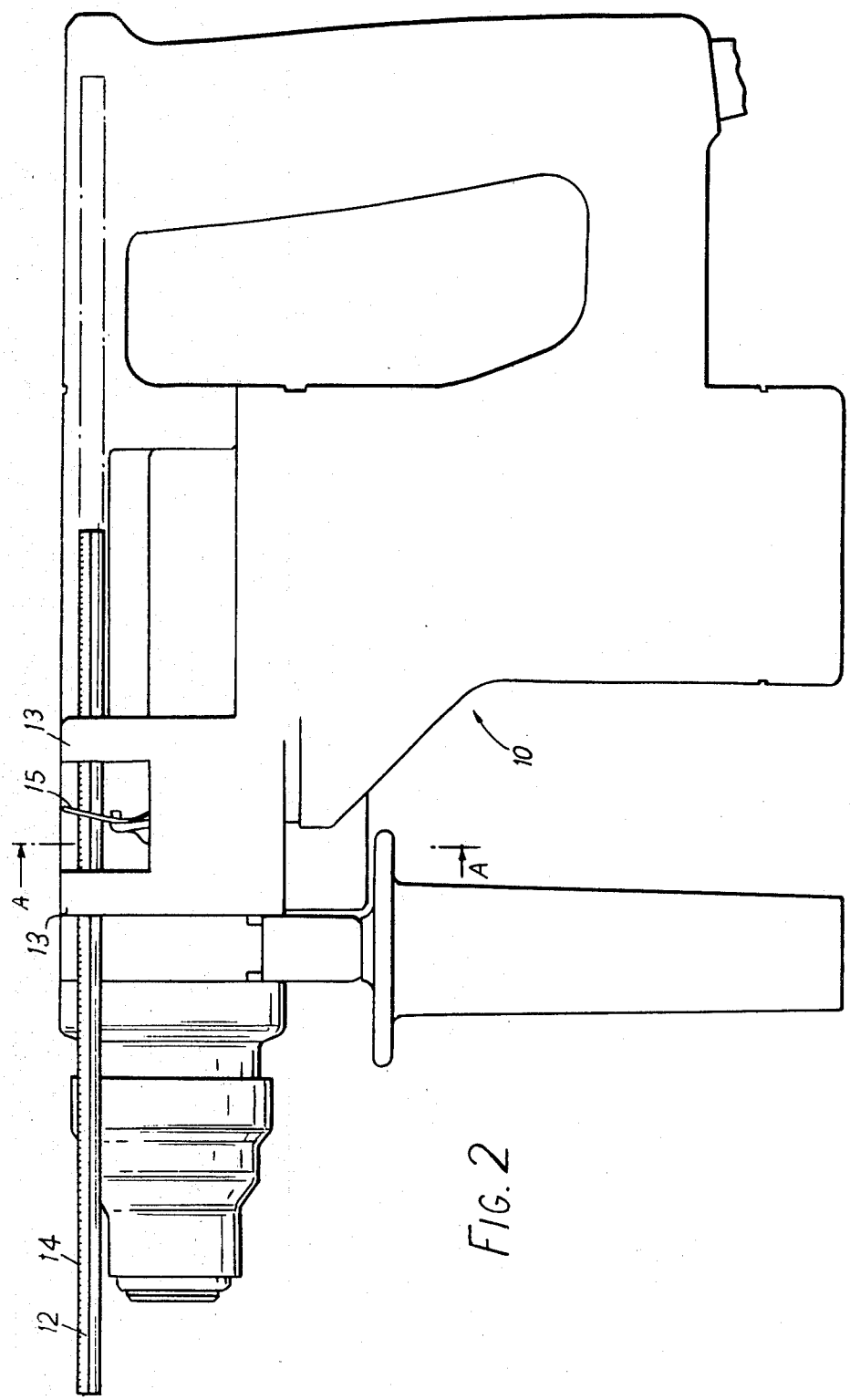
FIG. 2 is a side view of the tool of FIG. 1.

Referring to FIGS. 1 to 6 of the drawing, the body of the drilling tool 10 is shown only in outline and carries a chuck in which a twist drill 11 is mounted in the usual manner. The depth stop device is mounted at one side of the body and the stop proper is constituted by a hexagonal section rod 12 which is mounted for sliding movement along the direction of the longitudinal axis thereof or forward and rearward parallel to the direction of drilling movement in guide apertures or bores formed in flanges 13 on the body which are spaced longitudinally along the direction of the rod and which are shaped to prevent the rod from rotating about its longitudinal axis. The top face 14 of the rod is knurled as shown in FIGS. 1 and 5. Between the flanges 13 the rod extends through an aperture in a lever 15 made for example from strong metal sheet. The lever is pivotally mounted on one end of a pivot boss 16 located on the body at a position below the rod. The pivot boss projects at substantially a right angle with respect to the longitudinal direction of the rod. About the pin the lever is flanged as shown at 17 in FIGS. 3 and 4 to provide a bearing, and intermediate its ends a 90° twist is formed in the lever so that the free upper end part 18 of the lever extends in a plane generally normal to the axis of the rod. A torsion coil spring 19 is mounted on the pivot pin 16 and has two end parts 20, 21 of which part 20 abuts a stop surface 22 on the body and part 21 engages in a slot 23 in the upper end part 18 of the lever so as to urge the upper end of the lever rearward away from a workpiece engaged by the twist drill. In the illustrated embodiment, the slot 23 is shown opening to the bottom edge of the aperture in the lever. Referring now also to FIG. 6, the upper end part 18 of the lever is inclined rearward away from the workpiece so that the rearward edge of the periphery of the aperture in the lever forms a detent edge which can engage the serrations of the knurled surface 14 to form substantially a mechanical lock against sliding movement of the rod. A laterally projecting portion 18a of the upper end part of the lever is manually engageable by the operator to push the lever 15 forward and thus swing the detent edge forward and upward away from the rod to release the rod for adjustment. When the lever is released it locks again on the rod under the action of the spring 19. When the front end of the rod comes into abutment with the workpiece, any resulting rearward movement of the rod tends also to rotate the lever 15 rearward and hence pull the detent edge into tighter engagement with the serrations on the rod and therefore to resist the rearward movement of the rod.

The illustrated embodiment is advantageous in that all of the components are attached to the drill and there is no key or spanner to become mislaid or lost. It will be noted also that the flanges 13 protect the lever and spring against damage.

Referring now to FIG. 7, a modified embodiment is illustrated in which both the top and bottom faces of the rod 12 are engaged by respective peripheral edges of the aperture in lever 15. The distance between the two detent edges is greater than the distance between the complementary faces of the hexagonal rod and the guide apertures in the flanges 13 thus enabling the rod to move a limited amount in an up and down or transverse direction. When the lever is rotated by its spring, the two detent edges of the periphery of the aperture respectively engage the top and bottom surfaces of the rod and hold it against displacement in the longitudinal direction thereof. When the lever is rotated forward into a vertical position so as to disengage its detent edges, the rod moves upwards within its guide apertures to free the rod.

In the alternative arrangement illustrated in FIG. 8, the lever again has upper and lower detent edges for engaging opposite sides of the rod, but in this construction the rod is in a close sliding fit within its guide apertures in the flanges 13, and radial clearance is provided between the pivot boss 16 and the lever. This clearance enables the lever to float or move along its longitudinal axis to take up a position to which the rod is clamped between the two detent edges, and to release the rod when the lever is rotated or moved into its vertical position.

I claim:

1. A depth stop device for a drilling tool having a body, said depth stop device comprising:
   a pair of flanges attached to the body and being spaced with respect to one another in a direction substantially parallel to the drilling direction of the drilling tool, said flanges inwardly projecting toward the longitudinal center axis of the body and the respective outermost portions thereof being substantially flush with the respective outermost adjacent peripheries of the body, each of said flanges respectively having a bore therethrough;
   a stop rod slidably extending through each said bore in the direction of the longitudinal axis of said stop rod and in a direction substantially parallel to the drilling direction of the drilling tool for abutting an object to be drilled;
   the outer periphery of said stop rod and the inner periphery of each said bore being dimensioned for substantially non-rotatably fixing said stop rod about the longitudinal axis thereof;
   the outer periphery of said stop rod being knurled;
   a rigid lever pivotally mounted on the body about a pivotal axis eccentric to and extending in a direction substantially transverse to the longitudinal axis of said stop rod, said lever having a detent edge and being pivotally movable within the space between said flanges and in a first direction and to a first position for engaging said detent edge with said stop rod knurled outer periphery for restricting movement of said stop rod in the direction of the longitudinal axis thereof and for, when said stop rod abuts an object to be drilled, further pivotally moving said lever in said first direction and urging said detent edge into further engagement with said stop rod knurled outer periphery for further restricting movement of said stop rod in the direction of the longitudinal axis thereof;
   a spring means operatively associated with said lever for biasing said lever in said first position; and
   said lever being manually pivotally movable in a second direction opposite said first direction and to a second position for disengaging said detent edge from said stop rod.

2. A depth stop device as claimed in claim 1, wherein, when said lever is in said first position said first detent edge engages the peripheral portion of said stop rod that is most remote from the pivotal axis of said lever.

3. A depth stop device as claimed in claim 1, further comprising a guide means positioned on the body and operatively associated with said stop rod for substantially restricting movement of said stop rod in a radial direction with respect to the longitudinal axis thereof.

4. A depth stop device as claimed in claim 1, wherein the movement of said lever in the radial direction with respect to the pivotal axis thereof is substantially limited.

5. A depth stop device as claimed in claim 4, wherein:
   said first detent edge being a first surface of said lever; and
   said lever further having a second detent edge, said second detent edge being a second surface of said lever which is diametrically opposite said first surface.

6. A depth stop device as claimed in claim 5, further comprising:
   said lever having an aperture therethrough; and
   wherein said stop rod extends through said aperture and said detent edges are surfaces of the peripheral edge of said aperture.

7. A drilling tool for drilling in a longitudinal direction comprising:
   (a) a body;
   (b) first and second spaced flanges projecting from said body transversely of said longitudinal direction; a depression being formed in said body between said first flange and said second flange whereby said first and second flanges together with said depression form a protective pocket; first and second longitudinally aligned apertures being respectively formed in said first and second flanges;
   (c) a depth stop rod having a longitudinal axis parallel said longitudinal direction, slidably mounted in said first and second apertures for guided longitudinal movement, said first and second apertures and said rod having such dimensions that the boundaries of said first and second flanges adjacent said first and second apertures fix said rod against rotation about said longitudinal axis; said rod being knurled on its peripheral surface along at least a portion of its longitudinal extent;
   (d) a rigid lever disposed in said pocket between said first and second flanges and pivotally mounted to said body about a lever axis spaced from said rod and extending transversely of said longitudinal direction, said lever being fixed against movement parallel said lever axis so that said lever is substantially wholly concealed from all views parallel said longitudinal axis by said first and second flanges; said lever having a first detent edge and being pivotally movable in a first direction, and to a first position, for engaging said first detent edge with said stop rod knurled peripheral surface to restrict movement of said rod in said longitudinal direction; and
   (e) a spring means for exerting a biasing force for resiliently biasing said lever in said first position, in which position longitudinal movement of said rod relative to said body resulting from abutment of said rod with an object to be drilled urges said lever to rotate from said first position in the same direction as said biasing force of said spring means thereon and to press said first detent edge into further engagement with said stop rod knurled peripheral surface;
   (f) said lever having means for manual engagement thereof to manually pivot said lever in a second direction against said biasing force to disengage said first detent edge from said stop rod knurled peripheral surface.

8. A drilling tool as in claim 7, wherein said first detent edge engages the portion of said peripheral surface of said rod most remote from said pivot axis when said lever is in said first position.

9. A drilling tool as in claim 7, wherein said rod is vertically spaced from said first and second flange boundaries adjacent said first and second apertures in a direction perpendicular to both said longitudinal axis and said pivot axis so as to permit limited movement of said rod in said perpendicular direction.

10. A drilling tool as in claim 7, further comprising a pivot fixed to said body extending along said pivot axis, said lever being pivotally mounted to said pivot so as to permit limited radial movement of said lever with respect to said pivot axis.

11. A drilling tool as in claim 9, wherein said first detent edges faces one peripheral side of said rod, said lever having a second detent edge diametrically opposite said first detent edge and facing the side of said rod diametrically opposite said one peripheral side of said rod.

12. A drilling tool as in claim 11, wherein said lever has an enclosed aperture formed therein, said rod extending through said aperture of said lever, opposite edges of said aperture respectively forming said first and second detent edges.

* * * * *